No. 723,379. PATENTED MAR. 24, 1903.
L. H. GILMER.
BELTING.
APPLICATION FILED FEB. 12, 1902.
MODEL.
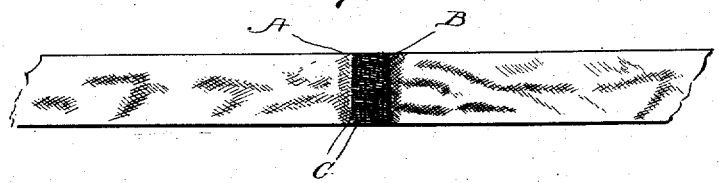
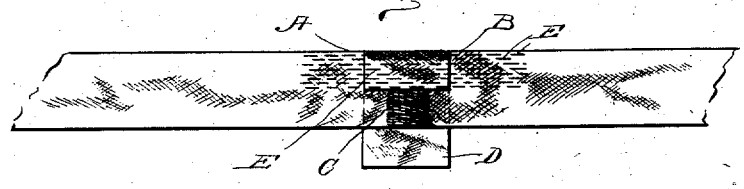
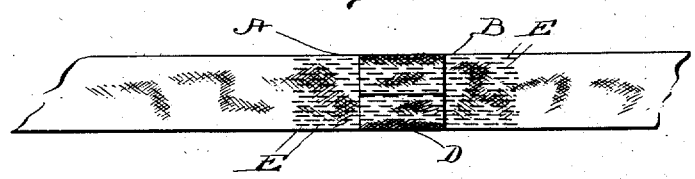
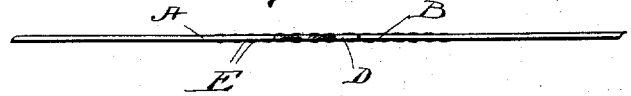
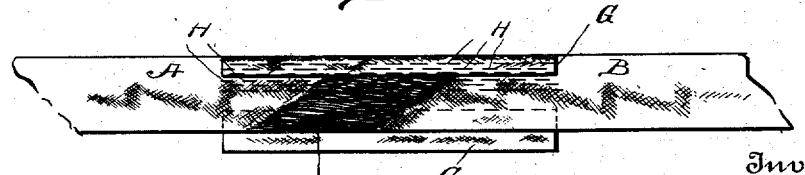
Witnesses
Bernard M. Offutt
M. W. Johnson
Inventor
Ludwell H. Gilmer
By David P. Moore
Attorney
THE NORRIS PETERS CO., PHOTO-LITHO., WASHINGTON, D. C.

UNITED STATES PATENT OFFICE.

LUDWELL H. GILMER, OF HOWARDSVILLE, VIRGINIA.

BELTING.

SPECIFICATION forming part of Letters Patent No. 723,379, dated March 24, 1903.

Application filed February 12, 1902. Serial No. 93,788. (Model.)

*To all whom it may concern:*

Be it known that I, LUDWELL H. GILMER, a citizen of the United States, residing at Howardsville, in the county of Albemarle and State of Virginia, have invented certain new and useful Improvements in Belting, of which the following is a specification.

This invention relates to improvements in belting; and the main object of my invention is the provision of a connection for a belt to be used where a very flexible connection is desired, as upon machines of very high speed—such as jewelers' lathes, routing-machines for lithographers, or, in fact, any machinery where a joint for the belting is desired to be made as flexible as the body of the belting itself—thus insuring the proper transmission of power and preventing the belt from leaving the pulley.

Another object of my invention is the provision of a flexible joint for fabric belts or belting which is very simple, durable, and inexpensive in construction and thoroughly efficient and practical in use.

To attain the desired objects, my invention consists of a flexible belting having a novel form of coupling, substantially as disclosed herein.

In the accompanying drawings, Figure 1 is a plan view of the ends of a piece of belting in its first step of connecting. Fig. 2 is a similar view with a portion of the binding-braid secured in place and a portion free. Fig. 3 is the completed connection. Fig. 4 is an edge view of the completed connection as shown in Fig. 3. Fig. 5 is a similar view to Fig. 2 of a modified form of connection or joint.

Referring to the drawings, A designates one end of the belting and B the other, the said ends of the belting being cut at a right angle to its sides. These ends are placed together, as shown in Fig. 1, and stitched with the peculiar transverse stitching C, so that the raveled ends are practically unobservable. Adapted to be placed crosswise of the two meeting ends of the belting is a strip or band of braid or other suitable material D, which is adapted to be held to the belting by means of the longitudinal stitchings E, which extend some little distance beyond the sides of the braid and are so closely made as to substantially weave the braid within the body of the belting. Thus it will be seen that by the placing of the braid in this manner and stitching it so closely to the fabric a comparatively thin and flexible joint is formed.

In the modified form of my invention I cut the ends of the belting on the bias, as at F, and place the raveled ends closer together. Two strips of braid G are then placed over the outer edges of both ends and by means of the longitudinal stitching H the strips of braid are securely fastened to the belting, and as said stitchings extend up and down across the entire body of the ends the meeting ends of the belting are reduced to a size substantially that of the belting itself.

It will thus be seen that by this construction of joint a very strong, flat, and flexible connection for belting of this character is provided and one which will readily yield and accommodate itself to various pulleys of high-speed machines, more particularly, however, for routing-machines and all high-speed machinery. By making a connection of this kind for belting the cost is very much reduced, both as to material and labor, and a very simple form is provided, thus rendering the invention thoroughly efficient and practical.

What I claim as new, and desire to secure by Letters Patent, is—

1. A flexible belting having its ends raveled and sewed together, and means for surrounding the ends of the belting and sewed thereto so as to form an integral mass.

2. A flexible belting having its ends raveled and sewed together, a strip of braiding surrounding the ends transversely, and a series of longitudinal stitchings to secure the braiding to the belting and extending beyond the edges of the braiding.

3. A flexible belting having its ends raveled, a series of transversed stitchings sewed upon the joint made by the raveled ends, a strip of braid surrounding and lapping over said joint, and longitudinal stitchings to secure the braid to the belting.

4. A flexible belting having its ends raveled, transversed stitchings securing said raveled ends together, and means surrounding said joint and sewed thereto so as to be substantially the same thickness as the body of the belting.

5. A flexible belting having its ends raveled, transversed stitchings securing said raveled ends together, a band of braid surrounding the joint so formed, and longitudinal stitchings connecting the braid to the belting.

6. A flexible belting having its ends raveled, a series of transversed stitchings connecting the raveled ends and reducing their thickness to that of the body of the belting, means surrounding the joint so made, and longitudinal stitchings passing through said means and beyond the same on the belting to reduce the joint to substantially the same thickness as the body of the belting.

7. A flexible belting having its meeting ends unraveled, transverse stitchings securing the unraveled ends together, and longitudinal stitchings across the joint so formed; said transverse stitchings preventing transverse stitching of the belt while the longitudinal stitchings prevent longitudinal stitching of the belt.

In testimony whereof I affix my signature in presence of two witnesses.

LUDWELL H. GILMER.

Witnesses:
SAMUEL DUDGEON,
THOS. SHALLCROSS, Jr.

---

Corrections in Letters Patent No. 723,379.

It is hereby certified that in Letters Patent No. 723,379, granted March 24, 1903, upon the application of Ludwell H. Gilmer, of Howardsville, Virginia, for an improvement in "Belting," errors appear in the printed specification requiring correction, as follows: In lines 25 and 26–27, page 2, the word "stitching" should read *stretching;* and that the said Letters Patent should be read with these corrections therein that the same may conform to the record of the case in the Patent Office.

Signed and sealed this 7th day of April, A. D., 1903.

[SEAL.]

F. I. ALLEN,
*Commissioner of Patents.* eled, transversed stitchings securing said raveled ends together, and means surrounding said joint and sewed thereto so as to be substantially the same thickness as the body of the belting.

5. A flexible belting having its ends raveled, transversed stitchings securing said raveled ends together, a band of braid surrounding the joint so formed, and longitudinal stitchings connecting the braid to the belting.

6. A flexible belting having its ends raveled, a series of transversed stitchings connecting the raveled ends and reducing their thickness to that of the body of the belting, means surrounding the joint so made, and longitudinal stitchings passing through said means and beyond the same on the belting to reduce the joint to substantially the same thickness as the body of the belting.

7. A flexible belting having its meeting ends unraveled, transverse stitchings securing the unraveled ends together, and longitudinal stitchings across the joint so formed; said transverse stitchings preventing transverse stitching of the belt while the longitudinal stitchings prevent longitudinal stitching of the belt.

In testimony whereof I affix my signature in presence of two witnesses.

LUDWELL H. GILMER.

Witnesses:
SAMUEL DUDGEON,
THOS. SHALLCROSS, Jr.

---

Corrections in Letters Patent No. 723,379.

It is hereby certified that in Letters Patent No. 723,379, granted March 24, 1903, upon the application of Ludwell H. Gilmer, of Howardsville, Virginia, for an improvement in "Belting," errors appear in the printed specification requiring correction, as follows: In lines 25 and 26–27, page 2, the word "stitching" should read *stretching;* and that the said Letters Patent should be read with these corrections therein that the same may conform to the record of the case in the Patent Office.

Signed and sealed this 7th day of April, A. D., 1903.

[SEAL.]

F. I. ALLEN,
*Commissioner of Patents.*

Corrections in Letters Patent No. 723,379.

It is hereby certified that in Letters Patent No. 723,379, granted March 24, 1903, upon the application of Ludwell H. Gilmer, of Howardsville, Virginia, for an improvement in "Belting," errors appear in the printed specification requiring correction, as follows: In lines 25 and 26–27, page 2, the word "stitching" should read *stretching;* and that the said Letters Patent should be read with these corrections therein that the same may conform to the record of the case in the Patent Office.

Signed and sealed this 7th day of April, A. D., 1903.

[SEAL.]

F. I. ALLEN,
*Commissioner of Patents.*